(12) United States Patent
Claus et al.

(10) Patent No.: US 11,262,264 B2
(45) Date of Patent: Mar. 1, 2022

(54) SENSOR ELEMENT WITH INTEGRAL SUPPORTING AND SENSOR BODY

(71) Applicant: Carl Freudenberg KG, Weinheim (DE)

(72) Inventors: Tanja Claus, Mannheim (DE); Boris Traber, Hirschberg (DE); Stefan Sindlinger, Weinheim (DE); Olaf Nahrwold, Ludwigshafen (DE); Christian Kleinke, Darmstadt (DE)

(73) Assignee: CARL FREUDENBERG KG, Weinheim (DE)

( * ) Notice: Subject to any disclaimer, the term of this patent is extended or adjusted under 35 U.S.C. 154(b) by 46 days.

(21) Appl. No.: 16/705,259

(22) Filed: Dec. 6, 2019

(65) Prior Publication Data

US 2020/0182726 A1 Jun. 11, 2020

(30) Foreign Application Priority Data

Dec. 7, 2018 (DE) .......................... 102018131352.7

(51) Int. Cl.
*G01L 13/02* (2006.01)
*G01L 13/06* (2006.01)
(52) U.S. Cl.
CPC ............ *G01L 13/025* (2013.01); *G01L 13/06* (2013.01)

(58) Field of Classification Search
CPC .............................. G01L 13/06; G01L 13/025
See application file for complete search history.

(56) References Cited

U.S. PATENT DOCUMENTS

| 8,266,971 | B1* | 9/2012 | Jones | G01L 1/146 |
| | | | | 73/862.046 |
| 8,919,211 | B1* | 12/2014 | Hanson | G01L 1/142 |
| | | | | 73/862.626 |
| 9,138,170 | B2* | 9/2015 | Huang | A61B 5/1038 |
| 9,534,972 | B2* | 1/2017 | Eichhorn | G01L 9/0054 |
| 9,802,316 | B2* | 10/2017 | Koselka | G01L 5/009 |
| 10,527,504 | B2* | 1/2020 | Ho | G01L 1/148 |
| 2010/0132458 | A1 | 6/2010 | Reiter | |

FOREIGN PATENT DOCUMENTS

| CN | 201946437 U | 8/2011 |
| CN | 103954394 A | 7/2014 |
| DE | 102018006392 A1 | 2/2019 |
| EP | 2113760 A1 | 11/2009 |

* cited by examiner

*Primary Examiner* — Nathaniel T Woodward
(74) *Attorney, Agent, or Firm* — Leydig, Voit & Mayer, Ltd.

(57) ABSTRACT

A sensor element includes: a supporting body; and a sensor body, the sensor body being planar and being formed of an elastic material, a first surface and a second surface of the sensor body each having an electrically conductive coating. The supporting body and the sensor body are integrally formed.

12 Claims, 3 Drawing Sheets

SENSOR ELEMENT WITH INTEGRAL SUPPORTING AND SENSOR BODY

CROSS-REFERENCE TO PRIOR APPLICATION

Priority is claimed to German Patent Application No. DE 10 2018 131 352.7, filed on Dec. 7, 2018, the entire disclosure of which is hereby incorporated by reference herein.

FIELD

The invention relates to a sensor element comprising a supporting body and a sensor body, wherein the sensor body is planar, wherein the sensor body is formed from an elastic material and wherein the first surface and the second surface of the sensor body are electrically conductively coated.

BACKGROUND

EP 2 113 760 A1 discloses a membrane-shaped sensor element as a pressure sensor. Here the sensor element comprises a sensor body which is planar in sections. The sensor body is accommodated in a tubular housing, wherein the pressure of a first space acts on the first surface of the sensor body and the pressure of a second space acts on the second surface of the sensor body.

The sensor body thereby detects the pressure difference between the two spaces. This is achieved by virtue of the fact that the sensor body deforms due to the different pressures, wherein the distance between the first surface and the second surface, that is to say the wall thickness of the sensor body, changes due to the elastic design of the sensor body.

The electrically conductive first surface and the electrically conductive second surface of the sensor body form capacitor plates, wherein the capacitance of the capacitor formed thereby changes as the distance between the two surfaces changes. As a result, the pressure difference between the pressure of the first space adjoining the first surface and that of the second space adjoining the second surface can be determined on the basis of the changing capacitance.

In such a sensor element, in particular the electrical contacting of the two conductive surfaces of the electrically conductive sensor body is complicated. In addition, in the case of measurements of low pressure differences, a small distance between the two conductively equipped surfaces is required in order to obtain a meaningful measurement signal. Such sensor bodies accordingly have a particularly thin layer in the form of a thin membrane and are therefore difficult to assemble.

SUMMARY

In an embodiment, the present invention provides a sensor element, comprising: a supporting body; and a sensor body, the sensor body being planar and comprising an elastic material, a first surface and a second surface of the sensor body each having an electrically conductive coating, wherein the supporting body and the sensor body are integrally formed.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
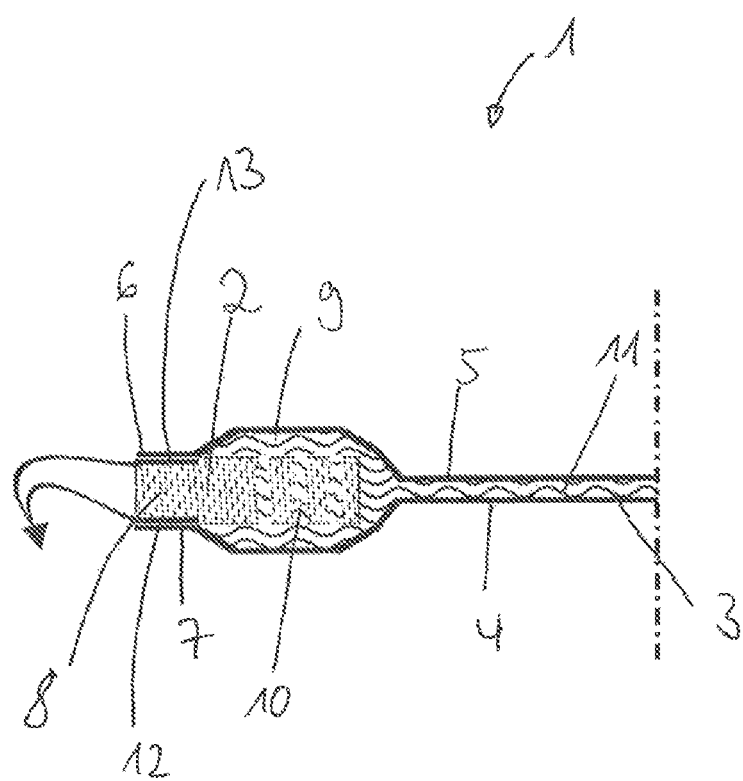
FIG. 1 a first sensor element in section.

In an embodiment, the invention present invention provides a sensor element which enables the measurement of low pressure differences and can be assembled cost-effectively and easily.

The sensor element according to the invention comprises a supporting body and a sensor body, wherein the sensor body is of planar design, made of an elastic material. The planar sensor body has two surfaces. The first surface and the second surface of the sensor body are electrically conductively coated. The two surfaces are electrically insulated from one another, i.e., not electrically conductively connected to one another. The coating is preferably carried out on both surfaces with the same material, since this is particularly favorable in terms of production technology.

To achieve the object, the supporting body and the sensor body are integrally formed. The supporting body and the sensor body thereby form an installable unit, whereby the handling of the sensor body in particular is simplified. As a result, a sensor body with a particularly small layer thickness can be formed, which allows particularly low pressure differences to be detected.

The surface coating can be realized particularly easily in terms of production technology in that, in a particularly advantageous development, the first surface and the second surface of the sensor body are each electrically conductively coated over their entire surface.

The supporting body can be tubular. The supporting body can take the form of a pipe socket, for example. A pipe socket is particularly easy to install. Alternatively, the supporting body can be disciform. The supporting body can here be designed, for example, in the form of a ring.

The sensor body can be disciform, i.e. planar. The disciform sensor body preferably closes off the tubular opening of the supporting body. As a result, the sensor body functions as a sealing element along the fastening section and prevents pressure equalization between the two spaces adjoining the surfaces of the sensor body.

In the sensor element according to the invention, it is advantageous that the sensor element with the sensor body and the supporting body can be produced in one operation and that the sensor body and the supporting body are firmly connected to one another.

In particular, the sensor body can be produced more simply since the sensor body together with the supporting body can be demolded more easily from a production tool than the membrane-like sensor body alone. Furthermore, the installation of the membrane-shaped sensor body is also simplified, since handling is simplified due to the connection to the supporting body. Furthermore, electrodes which are required for the contacting of the two electrically conductive surfaces can easily be integrated into the region of the fastening section or of the supporting body.

The electrically conductive coating of the first surface and the second surface of the sensor body can each extend at least in sections over the first surface and the second surface of the supporting body. This simplifies the contacting of the two electrically conductively equipped surfaces of the sensor body. In particular, it is not necessary to introduce separate electrodes into the sensor body, for example, incorporating them by vulcanization.

The electrically conductive first surface and the electrically conductive second surface form plates of a capacitor, wherein the capacitance of the capacitor formed thereby substantially results from the distance between the two surfaces. The sensor element can be placed in an arrangement which is designed such that the pressure of a first space acts on the first surface and the pressure of a second space acts on the second surface. If the pressure of the first space differs from the pressure of the second space, the membrane body will bulge in the direction of the space with lower pressure while the elastically formed sensor body deforms, wherein the layer thickness of the sensor body simultaneously changes due to the deformation. As a result, the distance between the first surface and the second surface changes simultaneously and the capacitance of the plate capacitor formed by the two surfaces changes. In this respect, the pressure difference can be determined by measuring the changed capacitance of the plate capacitor.

The supporting body and the sensor body can be formed from injection-moldable plastic. As a result, the supporting body and the sensor body can be produced at the same time in an injection-molding process. In this case, a toughened plastic is preferably selected for the supporting body and an elastic plastic is selected for the sensor body, for example an elastomer or a thermoplastic elastomer. Production takes place in this case in a two-component injection-molding process. The sensor body and the supporting body are thereby integrally formed and connected to one another in a particularly firmly bonded manner.

The supporting body and the sensor body can have congruent-volume positive-locking elements that are complementary to one another. For example, the supporting body can have recesses and/or apertures which are suitable for receiving material of the sensor body. During production, the material of the sensor body penetrates the recesses or apertures, which in addition to the material-to-material connection also brings about a positive-locking attachment.

The supporting body may have a radially inwardly pointing flange. The sensor body can be fastened to the supporting body in the region of the flange.

The sensor body preferably extends on both sides of the flange of the supporting body. As a result, the sensor body is particularly firmly attached to the supporting body and the sensor element is particularly robust. The recesses and/or apertures are preferably introduced into the flange.

The region of the flange deforms only insignificantly in the event of a pressure difference, in particular in comparison with the elastic sensor body, which improves the measuring accuracy.

The sensor body may have a thickened portion in the transition region to the supporting body. The thickened portion is annular and surrounds a disciform measuring section. This results in high mechanical stability. The layer thickness of the thickened portion is in this case greater than the layer thickness of the disciform measuring section, in particular by a multiple thereof. The layer thickness here designates the distance between the first surface and the second surface.

The transition between the measuring section and the thickened portion can take place in steps, wherein the layer thickness increases abruptly.

Starting from the measuring section the layer thickness preferably increases linearly up to the layer thickness of the thickened portion. This results in an oblique transition region which forms the transition between the measuring section and the thickened portion.

The measuring section and the thickened portion can be arranged relative to one another such that the layer thickness increases on both sides and starting from the first surface and the second surface of the measuring section, so that the measuring section is arranged in a centered position in the thickened portion.

Alternatively, the measuring section and the thickened portion may be arranged along a surface in a radial plane. In this embodiment, the layer thickness of the thickened portion only increases along one surface.

Because the thickened portion has a different layer thickness than the measuring section, a significantly lower deformation takes place in the region of the thickened portion than in the region of the measuring section. The layer thickness of the thickened portion is preferably selected such that the thickened portion has a reduced offset capacitance. The thickened portion thus does not affect the measured result. The advantageous effect is established when the layer thickness of the fastening section is at least twice as large as the layer thickness of the measuring section. The layer thickness of the fastening section is preferably three times the layer thickness of the measuring section.

For the measurement of small pressure differences, it is advantageous if the layer thickness of the measuring section is 0.3 mm to 0.8 mm, preferably 0.5 mm.

In a preferred development, contact elements for producing a signal-conducting connection of the conductive coatings to a measuring device are provided on the supporting body.

The supporting body can be provided with at least one contact element for an electrically conductive contact with the electrically conductive first surface and/or the electrically conductive second surface of the sensor body. For this purpose, the supporting body can likewise be provided with an electrically conductive coating, for example with printed conductor paths. Alternatively, the supporting body can take the form of insert elements made of electrically conductive metallic material. These contact elements are thus arranged between the surface of the supporting body and the coating of the supporting body. When coating the supporting body, an electrically conductive connection between contact elements and conductive coating is thus automatically created.

The supporting body is preferably equipped with elements for the connection of cables or cable lugs. These are in electrical contact with the at least one contact element.

The invention also relates to a method for producing a sensor element as described above in a two-component injection-molding process, wherein the injection-moldable plastic materials for the supporting body and the sensor body can be injected into respective molds. The electrically conductive coating is produced in a subsequent step.

The figures show a sensor element 1 for detecting the pressure difference between two adjoining spaces. The spaces are located above and below the sensor element 1. The sensor element 1 comprises a supporting body 2 and a sensor body 3, wherein the sensor body 3 is planar and consists of elastic material. In the present embodiment, the sensor body 3 is made of ethylene propylene diene monomer (EPDM). The supporting body 2 is made of polyamide (PA). Further elastomeric materials are conceivable and can be selected according to the application case and aggressive media. The sensor element is produced in a two-component injection-molding process and the sensor body 3 and the supporting body 2 are bonded to one another.

The first surface 4 and the second surface 5 of the sensor body 3 are electrically conductively coated, wherein the coating is selected in each case in such a way that the first surface 4 and the second surface 5 of the sensor body 3 are coated electrically conductively over their entire surface. The electrically conductive coating may, for example, be vapor-deposited on the first surface 4 and the second surface 5. However, the coating can also take the form of a lacquer with electrically conductive particles.

The supporting body 2 has a flange 8 which faces radially inwardly. The electrically conductive coating of the first surface 4 and of the second surface 5 of the sensor body 3 extends in sections over the first surface 6 and the second surface 7 of the supporting body 2. As a result, a transition region with a thickened portion 9 formed from the material of the sensor body 3 is formed on both sides of the flange 8.

Apertures 10 which are filled with the material of the sensor body 3 are introduced into the flange 8. Congruent positive-locking elements are thereby formed, which bring about a positive-locking connection of the supporting body 2 and the sensor body 3.

The thickened portion 9 includes a measuring section 11, wherein the layer thickness of the thickened portion 9 is greater than the layer thickness of the measuring section 11.

The electrically conductive first surface 4 and the electrically conductive second surface 5 form plates of a plate capacitor, wherein the capacitance of the plate capacitor substantially results from the distance between the two surfaces 4, 5. Due to the elastic design of the sensor body 3, the sensor body 3 deforms when the pressure of a first space acts on the first surface 4 and the pressure of a second space acts on the second surface 5, wherein the pressure of the first space differs from the pressure of the second space. If a pressure difference prevails between the two, the measuring section 6 will bulge in the direction of the space with lower pressure, whereby the measuring section 11 of the sensor body 3 deforms and whereby at the same time the distance between the first surface 4 and the second surface 5 changes, which is accompanied by a change in the capacitance of the plate capacitor. Thus, by measuring the capacitance of the plate capacitor, the pressure difference of the two pressures acting on the sensor body 3 can be determined.

The layer thickness of the thickened portion 9 is selected such that this region has a reduced offset capacitance and thereby does not significantly, in particular not noticeably, influence the change in capacitance determined in the measuring section 11. For this purpose, the layer thickness of the thickened portion 9 in the present embodiments is three times that of the layer thickness of the measuring section 6. The layer thickness of the measuring section 6 is 0.5 mm. In addition, the supporting body 2 with the flange 8 extends into the thickened portion 9 and additionally stiffens the latter.

FIG. 1 shows a first embodiment of the sensor element 1. The sensor body 3 is disciform. The supporting body 2 is disciform in the form of a ring and has a flange 8, wherein the sensor body 3 extends in the region of the thickened portion 9 on both sides of the flange 8. The supporting body 2 is equipped on both sides with contact elements 12, 13 for electrical contact with the electrically conductive first surface 4 and the electrically conductive second surface 5. Both contact elements 12, 13 have connecting means for receiving cables for electrical contact with a measuring device, for example in the form of cable lugs.

Figure 2:
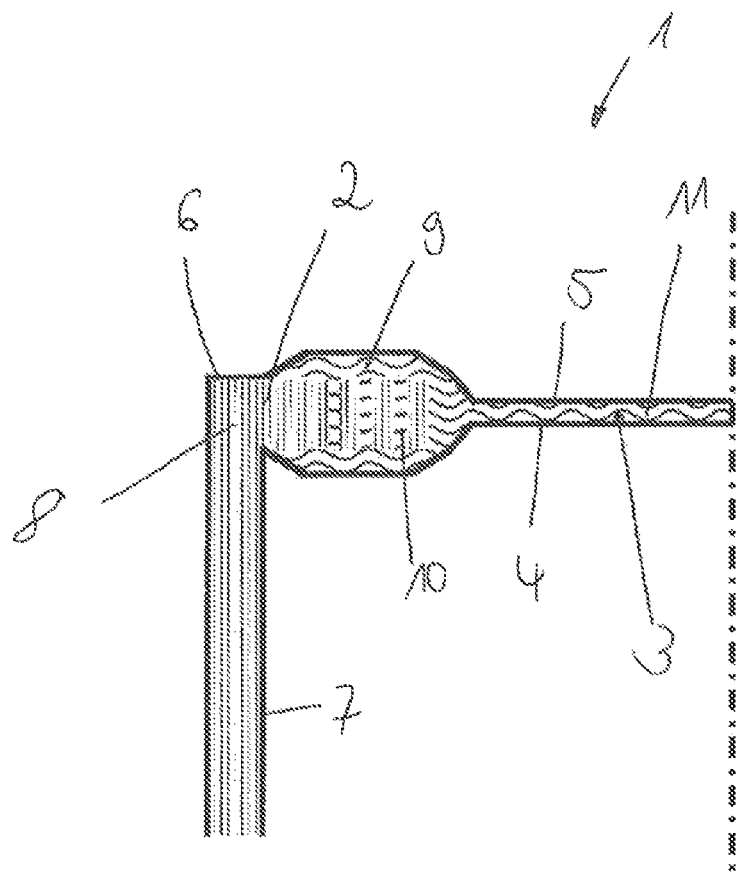
FIG. 2 another sensor element tubular supporting body.

FIG. 2 shows a development of the sensor element 1 shown in FIG. 1. In the present embodiment, the supporting body 2 is tubular and has a radially inwardly facing flange 8 with an opening on one end face, wherein the sensor body 3 closes off the opening of the supporting body 2.

Figure 3:
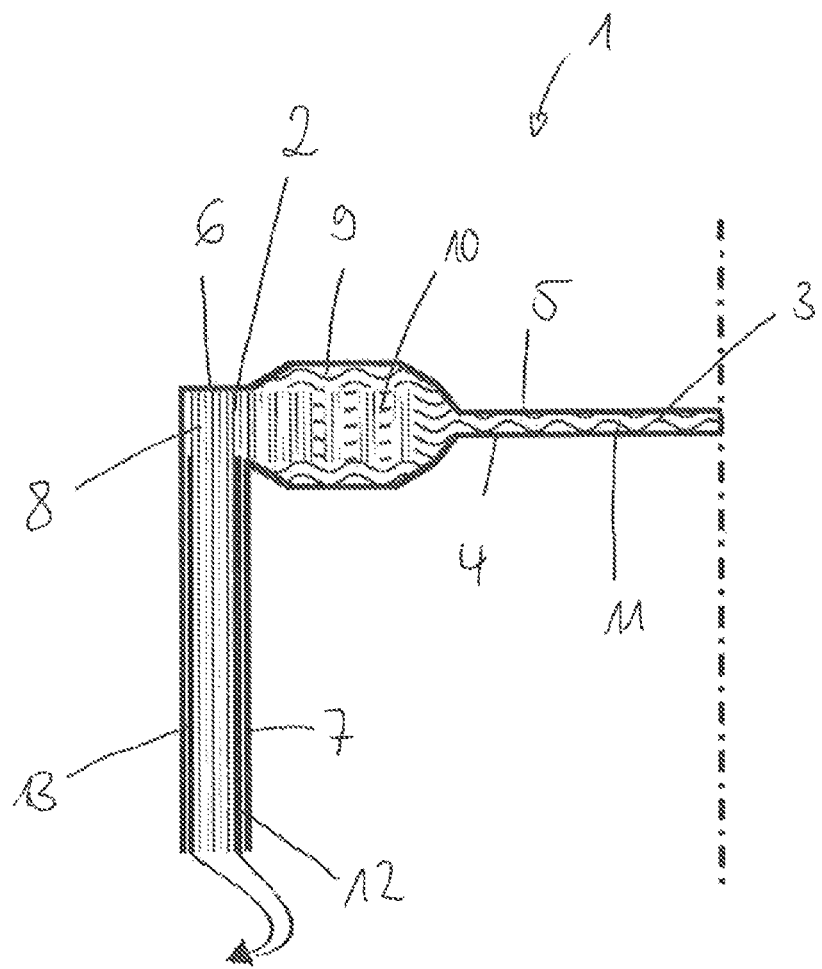
FIG. 3 a sensor element with contact elements.

FIG. 3 shows the embodiment according to FIG. 2, wherein the supporting body 2 along the flange 8 and the tubular section is equipped on both sides with contact elements 12, 13 for electrical contact with the electrically conductive first surface 4 and the electrically conductive second surface 5. Both contact elements 12, 13 have connecting means for receiving cables for electrical contact with a measuring device, for example in the form of cable lugs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sensor element, comprising:
   a sensor body, the sensor body being planar and comprising an elastic material, a first surface and a second surface of the sensor body each having an electrically conductive coating, wherein the sensor body includes a measuring portion and an annular thickened portion surrounding the measuring portion, wherein a layer thickness of the annular thickened portion is greater than a layer thickness of the measuring portion; and
   a supporting body supporting the sensor body,
   wherein the supporting body and the sensor body are integrally formed.

2. The sensor element according to claim 1, wherein the supporting body is tubular or disciform.

3. The sensor element according to claim 2, wherein the sensor body is disciform.

4. The sensor element according to claim 3, wherein the sensor body closes off an opening of the supporting body.

5. The sensor element according to claim 2, wherein the supporting body has a flange which faces radially inward.

6. The sensor element according to claim 5, wherein the sensor body extends on both sides of the flange of the supporting body.

7. The sensor element according to claim 1, wherein the electrically conductive coating of the first surface and of the second surface of the sensor body extends at least in sections over a first surface and a second surface of the supporting body.

8. The sensor element according to claim 1, wherein the supporting body and the sensor body comprise a plastic, and wherein the plastic is configured to be injection-moldable.

9. A method for producing the sensor element according to claim 8, comprising:
producing the sensor element in a two-component injection-molding process.

10. The sensor element according to claim 1, wherein the supporting body and the sensor body have positive-locking elements that are complementary to each other.

11. The sensor element according to claim 1, wherein the annular thickened portion is located in a transition region to the supporting body.

12. The sensor element according to claim 1, further comprising contact elements on the supporting body, the contact elements being configured to produce a signal-conducting connection of the conductive coatings to a measuring device.

\* \* \* \* \*